US009604368B2

(12) United States Patent
Holgate (10) Patent No.: US 9,604,368 B2
(45) Date of Patent: Mar. 28, 2017

(54) ACTIVE COMPLIANT PARALLEL MECHANISM

(71) Applicant: SpringActive, Inc., Tempe, AZ (US)

(72) Inventor: Matthew Aaron Holgate, Chandler, AZ (US)

(73) Assignee: SpringActive, Inc., Tempe, AZ (US)

( * ) Notice: Subject to any disclaimer, the term of this patent is extended or adjusted under 35 U.S.C. 154(b) by 0 days.

(21) Appl. No.: 13/673,177

(22) Filed: Nov. 9, 2012

(65) Prior Publication Data

US 2013/0118287 A1 May 16, 2013

Related U.S. Application Data

(60) Provisional application No. 61/558,761, filed on Nov. 11, 2011.

(51) Int. Cl.
*B25J 17/00* (2006.01)
*B25J 17/02* (2006.01)

(52) U.S. Cl.
CPC ........... *B25J 17/00* (2013.01); *B25J 17/0216* (2013.01); *Y10T 74/20305* (2015.01)

(58) Field of Classification Search
CPC ................ A61F 2002/7615; A61F 2/64; A61F 2002/7625; A61F 2002/7685; A61F 2/6607;
(Continued)

(56) References Cited

U.S. PATENT DOCUMENTS 2,568,051 A * 9/1951 Catranis .................. A61F 2/604
137/493.7
3,953,900 A * 5/1976 Thompson .............. A61F 2/582
623/27
(Continued)

FOREIGN PATENT DOCUMENTS

DE 3923057 A1 1/1991
WO 2011005482 A2 1/2011
(Continued)

OTHER PUBLICATIONS

Belforte, G. et. al., "Pneumatic Active Gait Orthosis". Mechatronics 11, 2001, pp. 301-323.
(Continued)

*Primary Examiner* — William Kelleher
*Assistant Examiner* — Zakaria Elahmadi
(74) *Attorney, Agent, or Firm* — Robert D. Atkins; Patent Law Group: Atkins and Associates, P.C.

(57) ABSTRACT

An active compliant parallel device includes a movable body; a base body; and a plurality of linking members. The plurality of linking members are coupled to the movable body and the base body by a plurality of joints and include at least one compliant linking member, having a compliant element, and at least one actuating linking member, having an actuating element. The device may further include at least one damping linking member having a damping element and/or at least one passive linking member. The actuating, compliant, passive, and/or damping linking members are arranged in a parallel arrangement or structure such that each linking member makes a connection, using a connection element, such as a joint, with the base body and the movable body. The potential configurations of the device allow for movement and positioning of one or more unrestricted and externally loaded elements in space.

22 Claims, 10 Drawing Sheets

(58) Field of Classification Search
CPC ...... A61F 2002/5066; A61F 2002/7635; A61F 2/68; A61F 2/60; A61F 2002/701; A61F 2002/745
USPC ......... 74/490.01; 901/19; 623/24, 40, 44, 52
See application file for complete search history.

(56) References Cited

U.S. PATENT DOCUMENTS

| | | | | |
|---|---|---|---|---|
| 5,948,021 | A * | 9/1999 | Radcliffe | A61F 2/644 188/285 |
| 6,086,616 | A * | 7/2000 | Okuda | A61F 2/644 623/44 |
| 6,378,190 | B2 * | 4/2002 | Akeel | B23P 19/105 29/407.08 |
| 6,543,987 | B2 * | 4/2003 | Ehrat | B25J 15/0616 414/729 |
| 7,118,601 | B2 * | 10/2006 | Yasui | A61F 2/60 403/377 |
| 7,300,240 | B2 * | 11/2007 | Brogardh | B25J 17/0266 414/680 |
| 7,431,737 | B2 | 10/2008 | Ragnarsdottir et al. | |
| 7,578,799 | B2 * | 8/2009 | Thorsteinsson | A61B 5/1038 602/16 |
| 7,811,333 | B2 | 10/2010 | Jonsson et al. | |
| 7,896,927 | B2 * | 3/2011 | Clausen | A61F 2/66 623/24 |
| 8,057,550 | B2 * | 11/2011 | Clausen | A61F 2/60 623/24 |
| 8,287,477 | B1 | 10/2012 | Herr et al. | |
| 8,419,804 | B2 | 4/2013 | Herr et al. | |
| 8,500,823 | B2 * | 8/2013 | Herr | A61F 2/64 623/24 |
| 8,512,415 | B2 * | 8/2013 | Herr | A61F 2/60 623/24 |
| 8,551,184 | B1 * | 10/2013 | Herr | A61F 2/66 623/24 |
| 8,601,897 | B2 * | 12/2013 | Lauzier et al. | 74/490.01 |
| 8,716,877 | B2 | 5/2014 | Sugar et al. | |
| 8,734,528 | B2 | 5/2014 | Herr et al. | |
| 8,790,282 | B2 * | 7/2014 | Jung | A61H 3/00 601/5 |
| 2002/0007690 | A1 * | 1/2002 | Song | B23Q 1/5462 74/471 XY |
| 2003/0005786 | A1 | 1/2003 | Stuart et al. | |
| 2005/0070834 | A1 * | 3/2005 | Herr | A61B 5/1038 602/28 |
| 2006/0046907 | A1 | 3/2006 | Rastegar et al. | |
| 2006/0069448 | A1 * | 3/2006 | Yasui | A61F 2/60 623/24 |
| 2006/0249315 | A1 | 11/2006 | Herr et al. | |
| 2007/0129653 | A1 * | 6/2007 | Sugar | A61H 1/02 601/5 |
| 2008/0141813 | A1 * | 6/2008 | Ehrat | B25J 9/103 74/490.01 |
| 2009/0088912 | A1 * | 4/2009 | Rajaraman | B25J 9/106 701/19 |
| 2009/0265018 | A1 * | 10/2009 | Goldfarb | A61F 2/60 623/40 |
| 2010/0113980 | A1 * | 5/2010 | Herr | A61F 2/60 600/587 |
| 2010/0161077 | A1 | 6/2010 | Boone et al. | |
| 2010/0241242 | A1 | 9/2010 | Herr et al. | |
| 2010/0275718 | A1 * | 11/2010 | Stuart | B25J 17/0266 74/490.01 |
| 2011/0126660 | A1 * | 6/2011 | Lauzier | B25J 17/0208 74/490.05 |
| 2011/0132131 | A1 * | 6/2011 | Worz | B25J 9/1623 74/490.05 |
| 2011/0196509 | A1 * | 8/2011 | Jansen | B25J 9/109 623/26 |
| 2011/0208322 | A1 | 8/2011 | Rifkin et al. | |
| 2012/0078415 | A1 * | 3/2012 | Kubo | B25J 9/1623 700/245 |
| 2012/0153875 | A1 | 6/2012 | Glaister | |
| 2013/0142608 | A1 * | 6/2013 | Zhang | B25J 9/0051 414/729 |
| 2014/0114437 | A1 * | 4/2014 | Herr | A61F 2/6607 623/24 |
| 2014/0121782 | A1 * | 5/2014 | Herr | A61F 2/68 623/24 |

FOREIGN PATENT DOCUMENTS

| | | |
|---|---|---|
| WO | 2011096965 A2 | 8/2011 |
| WO | 2012091555 A1 | 7/2012 |
| WO | 2013086035 A1 | 6/2013 |

OTHER PUBLICATIONS

Herr, Hugh et al., "Patient-Adaptive Prosthetic and Orthotic Leg Systems", Proceedings of the International Federation for Medical & Biological Engineering, Reykjavik, Iceland, Jun. 18-22, 2002, pp. 18-21.

Colombo, Gery et. al., "Treadmill Training of Paraplegic Patients Using a Robotic Orthosis", Journal of Rehabilitation Research and Development. vol. 37 No. 6., 2000, pp. 693-700.

Guiraud, D., "Application of an Artificial Neural Network to the Control of an Active External Orthosis of the Lower Limb", Medical & Biological Engineering & Computing, Nov. 1994, vol. 32, pp. 610-614.

Hitt, J. et al., "A Robotic Transtibial Prothesis with Regenerative Kinetics: The Design Analyses, Methods, and Testing", U.S. Army Military Amputee Research Program, 2008.

Hitt, J. et al., "Robotic Transtibial Prosthesis with Biomechanical Energy Regeneration", Industrial Robot: An International Journal, vol. 36, Issue 5, pp. 441-447, 2009.

Hitt, J. et al., "The SPARKy (Spring Ankle with Regenerative Kinetics) Project: Design and Analysis of a Robotic Transtibial Prosthesis with Regenerative Kinetics", ASME International Design Engineering Technical Conferences & Computers and Information in Engineering Conference (IDETC/CIE), CD-ROM, pp. 1-10, 2007.

Holgate, M. et al., "A Novel Control Algorithm for Wearable Robotics Using Phase Plane Invariants", International Conference on Robotics and Automation, 2009.

Holgate, M. et al., "Control Algorithms for Ankle Robots: A Reflection on the State-of-the-Art and Presentation of Two Novel Algorithms", 2nd IEEE RAS & EMBS International Conference on Biomedical Robotics and Biomechatronics, pp. 97-103, 2008.

Holgate, M., "Control of a Robotic Transtibial Prosthesis", A Dissertation, Arizona State University, Dec. 2009.

Holgate, M. et al., "A Control Algorithm for a Prosthetic Ankle Using Phase Plane Invariants", Poster presentation at Dynamic Walking, Vancouver, Canada, 2009.

Holgate, M., "The SPARKy (Spring Ankle with Regenerative Kinetics) Project: Choosing a DC Motor Based Actuation Method" 2nd IEEE RAS & EMBS International Conference on Biomedical Robotics and Biomechatronics, pp. 163-168, 2008.

Hitt, J. et al., "An Active Foot-Ankle Prosthesis with Biomechanical Energy Regeneration", Journal of Medical Devices,vol. 4, 2010.

Bellman, R. et al., "SPARKy 3: Design of an Active Robotic Ankle Prosthesis with two Actuated Degrees of Freedom Using Regenerative Kinetics", 2nd IEEE RAS & EMBS International Conference on Biomedical Robotics and Biomechatronics, pp. 511-516, 2008.

Holgate M. et al., "A Control Algorithm for a Prosthetic Ankle Using Phase Plane Invariants", Poster presentation at Dynamic Walking, Vancouver, Canada, 2009.

Au S. et al. "Powered ankle-foot prosthesis to assist level-ground and stair-descent gaits," Neural Networks, 21, 2008, pp. 654.666.

Au S., "Powered Ankle-Foot Prosthesis for the Improvement of Amputee Walking Economy," Massachusetts Institute of Technology, 2007, pp. 1-108.

(56) References Cited

OTHER PUBLICATIONS

Hollander K. et al. "A Robust Control Concept for Robotic Ankle Gail Assistance," IEEE International Conference on Rehabilitation Robotics (ICORR), 2007, pp. 119-123.

Farley C. et al., "Biomechanics of Walking and Running: Center of Mass Movements to Muscle Action," Exerc Sport Sci Rev, vol. 26, pp. 253-285, 1998.

Au S. et al, "Powered ankle-foot prosthesis," Robotics & Automation Magazine, IEEE, vol. 15, pp. 52-59, 2008.

Au S. et al., "Powered Ankle-Foot Prosthesis for the Improvement of Amputee Ambulation," in Engineering in Medicine and Biology Society, 2007. EMBS 2007. 29th Annual International Conference of the IEEE, 2007, p. 3020.

Au S. et al., "Biomechanical Design of a Powered Ankle-Foot Prosthesis," in Rehabilitation Robotics, 2007. ICORR 2007. IEEE 10th International Conference on, 2007, pp. 298-303.

Au S. et al., "Powered Ankle--Foot Prosthesis Improves Walking Metabolic Economy," Robotics, IEEE Transactions on, vol. 25, pp. 51-66, 2009.

Sup F. et al., "Design and control of an active electrical knee and ankle prosthesis," in Biomedical Robotics and Biomechatronics, 2008. BioRob 2008. 2nd IEEE RAS & EMBS International Conference on, 2008, pp. 523-528.

Kyriakopoulos K. et al., "Minimum jerk path generation." International Conference on Robotics and Automation, 1:364-369, 1988.

Hansen A. et al., "The human ankle during walking: implications for design of biomimetic ankle prostheses and orthoses," Journal of Biomechanics, 37(10): 1467-1474, 2004.

Hansen A. et al., "Prosthetic ankle-foot mechanism capable of automatic adaptation to the walking surface," J Biomech Eng-T ASME, 131(3): 035002, 2009.

Hansen A. et al., "The Effects of Prosthetic Foot Roll-over Shape Arc Length on the Gait of Trans-tibial Prosthesis Users," Prosthetics and Orthotics International, vol. 30, No. 3, 286-299, 2006.

Bernardi, M. et al., (1995), "The Efficiency of Walking of Paraplegic Patients Using a Reciprocating Gait Orthosis," Spinal Cord 33(7): 409-415.

Boehler, Alexander W. et al., (2008), "Design, Implementation and Test Results of a Robust Control Algorithm for a Powered Ankle Foot Orthosis," IEEE International Conference on Robotics and Automation (ICRA), IEEE.

Hitt, Joseph et al., (2010), "Dismounted Soldier Biomechanical Power Regeneration Kit (SPaRK)," Proceedings of the 27th Army Science Conference, Orlando, FL.

Hitt, Joseph et al., (2010), "Bionic Running for Unilateral Transtibial Military Amputees," Proceedings of the 27th Army Science Conference, Orlando, FL.

Hollander, Kevin W. et al., (2005), "A Robotic "Jack Spring" for Ankle Gait Assistance," DETC2005-84492, ASME International Design Engineering Technical Conference (IDETC2005), Long Beach, CA, American Society of Mechanical Engineers.

Hollander, Kevin W. et al., (2006), "An Efficient Robotic Tendon for Gait Assistance," Journal of biomechanical engineering 128: 788.

Kawamoto, Hiroaki et al., (2003), "Power Assist Method for HAL-3 Estimating Operator's Intention Based on Motion Information," IEEE International Workshop on Robot and Human Interactive Communication, Millbrae, CA.

Kazerooni, H. et al., (2005), "On the Control of the Berkeley Lower Extremity Exoskeleton (BLEEX)," Proceedings of the 2005 IEEE International Conference on Robotics and Automation, Barcelona, Spain, Apr. 2005.

Norris, James A. et al., (2007), "Effect of Augmented Plantarflexion Power on Preferred Walking Speed and Economy in Young and Older Adults," Gait & Posture 25(4): 620-627.

Sawicki, Gregory S. et al., (2009), "Mechanics and Energetics of Incline Walking with Robotic Ankle Exoskeletons," Journal of Experimental Biology 212(1).

Sawicki, Gregory S. et al., (2009), "Powered Ankle Exoskeletons Reveal the Metabolic Cost of Plantar Flexor Mechanical Work During Walking with Longer Steps at Constant Step Frequency," Journal of Experimental Biology 212(1).

Sawicki, Gregory S. et al., (2009), "It Pays to Have a Spring in your Step," Exercise and Sport Sciences Reviews 37(3).

Sugar, Thomas G., (2002), "A Novel Selective Compliant Actuator," Mechatronics 12(9-10): 1157-1171.

Walsh, Conor James et al., "Development of a Lightweight, Under-Actuated Exoskeleton for Load-Carrying Augmentation," Proceedings of the 2006 IEEE International Conference on Robotics and Automation, Orlando, Florida, May 2006.

Walsh, Conor James et al., (2006), Biomimetic Design of an Under-Actuated Leg Exoskeleton for Load-Carrying Augmentation, Cambridge, MA, Massachusetts Inst of Tech, M.S.

Ward, Jeffrey et al., (2007), "Robotic Gait Trainer Reliability and Stroke Patient Case Study," IEEE 10th International Conference on Rehabilitation Robotics (ICORR), Holland.

Ward, Jeffrey et al., (2008), "Control Architectures for a Powered Ankle Foot Orthsosis," International Journal of Assistive Robotics and Mechatronics 9(2): 2-13.

Ward, Jeffrey et al., (2010), "Stroke Survivor Gait Adaptation and Performance After Training on a Powered Ankle Foot Orthosis," Proceedings of the IEEE International Conference on Robotics and Automation (ICRA), Anchorage, AK, IEEE.

Ward Jeffrey et al., (2011), "Using the Translational Potential Energy of Springs for Prosthetic Systems," IEEE Multi-conference on Systems and Control, Denver, CO, IEEE.

\* cited by examiner

ACTIVE COMPLIANT PARALLEL MECHANISM

BACKGROUND OF THE INVENTION

1. Field of the Invention

The field of the present invention is active compliant parallel mechanisms or devices, which move and position one or more, unrestricted and externally loaded, elements in space.

2. Background

The majority of active compliant devices utilize a traditional rigid structure. This traditional rigid structure typically includes links powered by actuators such as electric motors or hydraulics. A more recently developed strategy, however, employs an architecture having a joint which is powered by a compliant member, such as a spring, and an active member, such as a motor driven screw, arranged in series.

While this strategy and the aforementioned traditional structures may be suitable for their intended purpose, many fail to meet application requirements. For example, no known compliant devices offer characteristics where a compliant device is directed to applications having both high velocities under low load and low velocities under high load. Given these limitations, among others, there is a need for improved active compliant devices.

SUMMARY

The invention is directed to an active compliant parallel device comprising a movable body; a base body; and a plurality of linking members coupled to the movable body and the base body by a plurality of joints. The plurality of linking members comprises at least one compliant linking member having a compliant element and at least one actuating linking member having an actuating element. The device may further include at least one damping linking member having a damping element and/or at least one passive linking member. The actuating, compliant, passive, and/or damping linking members are arranged in a parallel arrangement or structure such that each linking member makes a connection, using a connection element, such as a joint, with the base body and the movable body. The potential configurations of the device allow for movement and positioning of one or more unrestricted and externally loaded elements in space.

BRIEF DESCRIPTION OF THE DRAWINGS

In the drawings, wherein like reference numerals refer to similar components.

DETAILED DESCRIPTION

Figure 1:
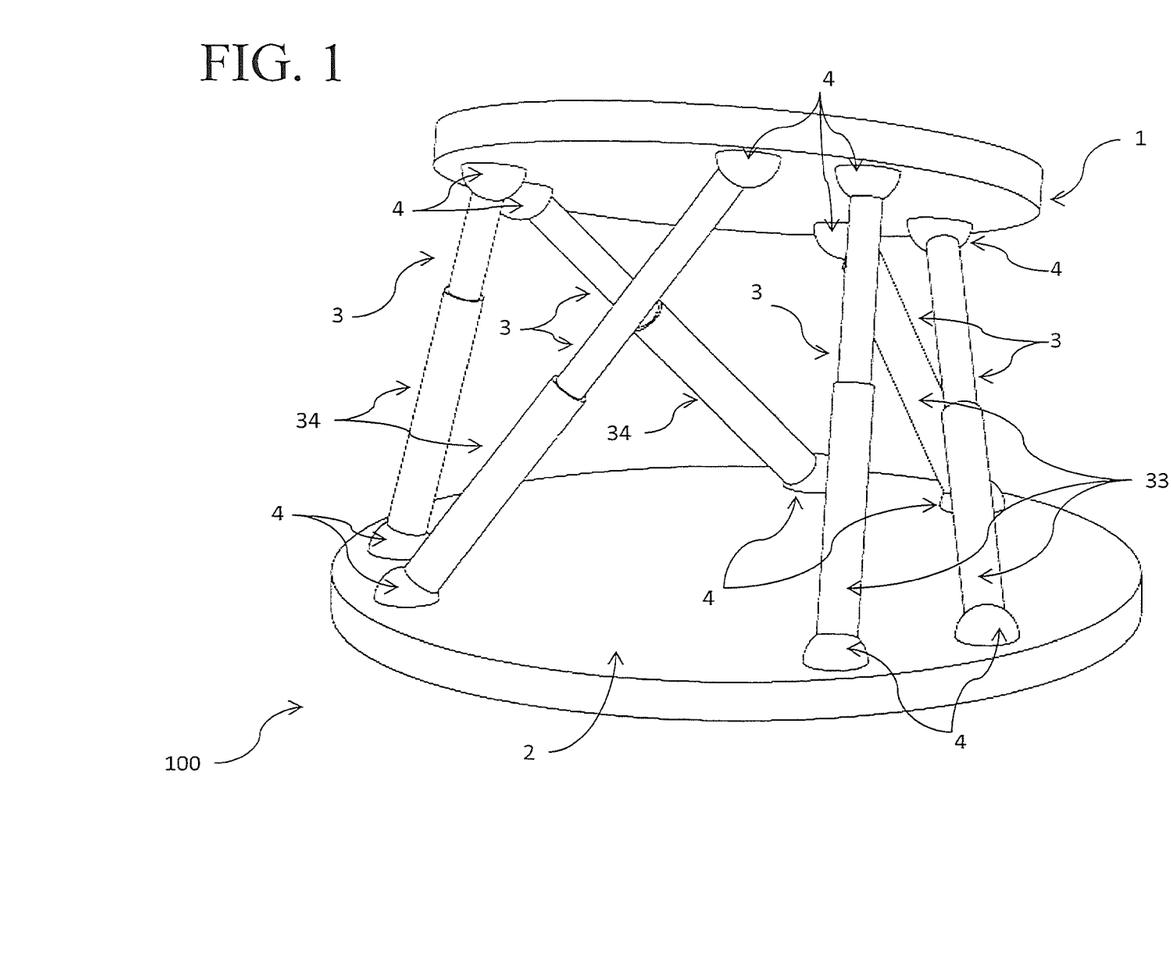
FIG. 1 is a perspective view of a first active compliant parallel device.
Figure 2:
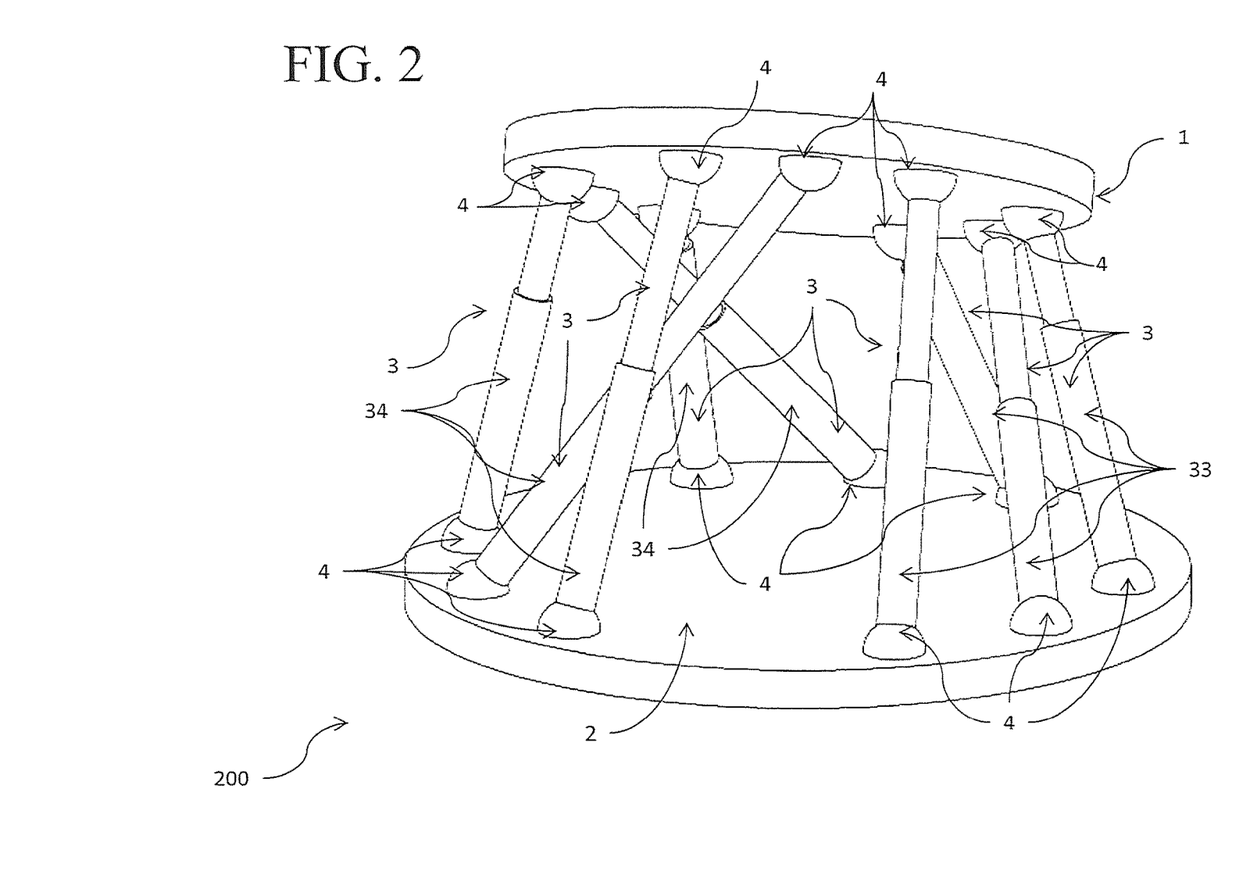
FIG. 2 is a perspective view of a second active compliant parallel device.
Figure 3:
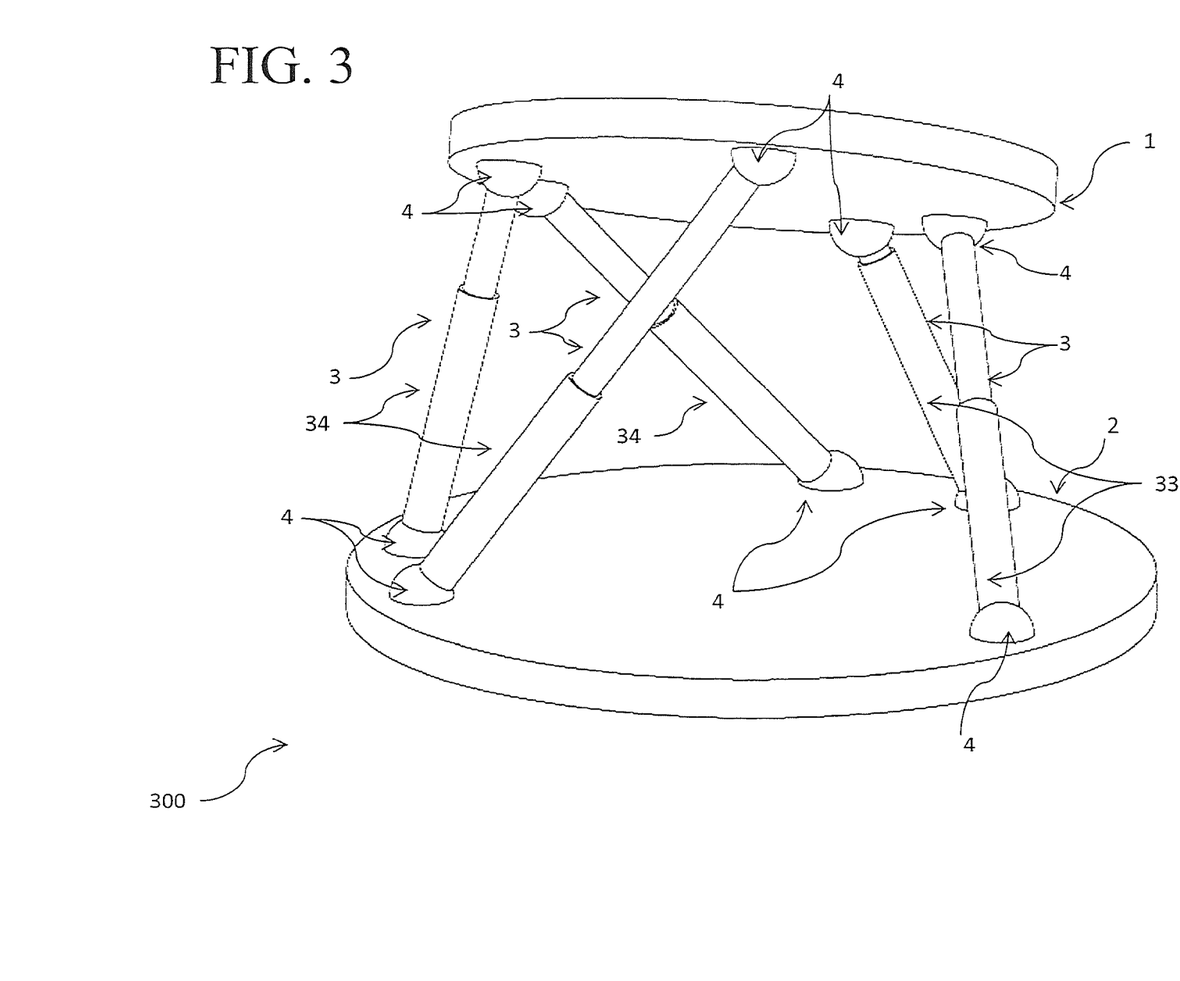
FIG. 3 is a perspective view of a third active compliant parallel device.

Turning in detail to the drawings, FIGS. 1-3 illustrate various embodiments of an active compliant parallel device comprising a movable body 1, a base body 2, linking members 3, and connection elements 4. In parallel arrangement, the movable body 1 is coupled to the base body 2 by linking members 3. As used herein, parallel arrangement is defined as an arrangement where each linking member 3 is coupled to the movable body 1 and the base body 2, using connection elements 4. Thus, the movable body 1 does not make a connection with the base body 2 except through use of linking members 3.

The embodiments shown in FIGS. 1 to 3 may provide for variations of active compliant devices that move and position one or more elements in space when the element is both unrestricted and under external load. According to one variation, the element which the active compliant parallel device moves and positions is the movable body 1.

In this variation, the movable body 1 is considered an ultimate working member. An ultimate working member is a component that is the output of the device. Alternatively, the movable body 1 in this variation may be connected to one or more other bodies, which are working members by connection through one or more linking bodies. Alternatively, the movable body 1 in this variation may be connected to one or more other bodies, which are working members by connection through one or more linking bodies.

According to another variation, the element which the active compliant parallel device moves and positions is one or more linking members. In this second variation, one or more of the linking members is considered the ultimate working member. An ultimate working member is a component that is the output of the device. Alternatively, the movable body 1 in this variation may be connected to one or more other bodies, which are working members by connection through one or more linking bodies. Alternatively, one or more of the linking members may be connected to one or more other bodies, which are working members by connection through one or more additional linking bodies.

According to yet another variation, the element which the active compliant parallel device moves and position is a combination of the movable body 1 and one or more linking members 3. In this third variation, the movable body and one or more of the linking members are the ultimate working members. Alternatively, these elements may be connected to one or more other bodies, which are the working members by connection through one or more additional linking bodies.

The linking members 3 shown in FIGS. 1 to 3 include at least one actuating linking member 33, at least one compliant linking member 34, any number, to include zero, of passive linking members 35 (not shown), and any number, to include zero, of damping linking members 36 (not shown). The linking members each apply from zero to five constraints on the degrees of freedom of the motion of the movable body with respect to the base body.

Therefore, the movable body 1 is linked to the base body 2 by actuating, compliant, passive, and/or damping linking members. The actuating linking members 33, compliant linking members 34, passive linking members 35, and/or damping linking members 36 are arranged in a parallel arrangement or structure, meaning each member makes a connection, using a connection element 4, with the base body 2 and also with the movable body 1. Moreover, actuating elements, compliant elements, and/or damping elements can be applied to any of the linking members and can reside on the same linking member.

Each linking member 3 is a kinematic chain made up of bodies connected by various joint types. These joint types include revolute joints, prismatic joints, and screw-type joints. In addition, the joint type may further include one or more higher pair joint types, which are represented by a combination of revolute joints, prismatic joints, and screw-type joints.

The kinematic freedom of the movable body 1 with respect to the base body 2 before being connected by the linking members 3 is six, i.e. three translational degrees of freedom and three rotational degrees of freedom. Each linking member 3 is arranged so that its kinematic constraints of motion between the base body 2 and the movable body 1 are such that from zero to five kinematic freedoms are lost before the application of actuating, compliant, or damping elements to any of the linking members 3. Each lost freedom can be described instantaneously by a rotation, a translation, or a linear combination of a rotation and a translation.

In the case of actuating linking members, compliant linking members, and damping linking members, one or more of the degrees of freedom of the member are controlled. As used herein, a controlled freedom is one that is regulated by a controlling element. The controlling element includes actuating, compliant, or damping elements, as determined by the type of member. For the purpose of characterization of a certain embodiment of the device, however, a controlled freedom is not considered a constraint on the motion of the movable body 1 with respect to the base body 2 by the linking member 3.

The actuating linking members are such that one or more of the joints or the degrees of freedom of the member are controlled by an active component, such as a motor. Therefore, actuating linking members are such that one or more of the joints of the member are actuated at the joint or one or more of the joints of the member are replaced by an actuating element or one or more of the degrees of freedom of the member are actuated across any number of the joints of the member. An actuating element of an actuating linking member may be any type of controllable position or force type actuator.

Compliant members are such that one or more of the joints or the degrees of freedom of the member are controlled by a compliant element, such as a spring. Therefore, compliant linking members are such that one or more of the joints of the member are controlled by a compliant element or one or more of the joints of the member are replaced by a compliant element or one or more of the degrees of freedom of the member are controlled by a compliant element across any number of the joints of the member. A compliant element of a compliant linking member may be a fixed rate compliant element, an adjustable variable rate compliant element, or a controllable variable rate compliant element.

Passive linking members are such that no joint of the member is regulated by any type of controlling element, no joint of the member is replaced by any type of controlling element, and no degree of freedom of the member is regulated by any type of controlling element.

Damping linking members are such that one or more of the joints or the degrees of freedom of the member are controlled by a damping component, such as a dashpot. Therefore, damping linking members are such that one or more of the joints of the member are controlled by a damping element or one or more of the joints of the member are replaced by a damping element or one or more of the degrees of freedom of the member are controlled by a damping element across any number of the joints of the member. A damping element of a damping linking member may be a fixed rate damping element, an adjustable variable rate damping element, or a controllable variable rate damping element.

Combination linking members are such that one or more of the joints of the member are controlled by an actuating, compliant, or damping element. Or, one or more of the joints of the member are replaced by an actuating, compliant, or damping element. Or, one or more of the degrees of freedom of the member are controlled by an actuating, compliant, or damping element across any number of the joints of the member. Moreover, additional or the same joints of the member are controlled by a controlling element of a different type, replaced by a controlling element of a different type, or additional or the same degrees of freedom of the member are controlled by a controlling element of a different type.

An actuating element of a combination linking member may be any type of controllable position or force type actuator. A compliant element of a combination linking member may be a fixed rate compliant element, an adjustable variable rate compliant element, or a controllable variable rate compliant element. A damping element of a combination linking member may be a fixed rate damping element, an adjustable variable rate damping element, or a controllable variable rate damping element.

By providing configurations of compliant linking members in combination with actuating linking members in a parallel arrangement, the structure allows for a change in geometry based on load, thereby effecting a change in transmission ratio of the input to the output of the device. These configurations are especially adapted for applications where high velocities under low load are needed at times and low velocities under high load are needed at other times.

According to one configuration, the linking members 3 are used to constrain motion of the movable body 1 with respect to the base body 2 so that the number of controlled freedoms, by actuation, compliance, or damping, of the linking members is equal to the number of freedoms afforded to the movable body 1 with respect to the base body 2 by the linking members 3. According to another configuration, linking members are used to constrain the motion of the movable body 1 with respect to the base body 2 so that the number of controlled freedoms, by actuation, compliance, or damping, of the linking members is greater than the number of freedoms afforded to the movable body 1 with respect to the base body 2 by the linking members 3. And according to a yet another configuration, the linking members are used to constrain the motion of the movable body 1 with respect to the base body 2 so that the number of controlled freedoms, by actuation, compliance, or damping, of the linking members is less than the number of freedoms afforded to the movable body 1 with respect to the base body 2 by the linking members 3. Therefore, by connecting the movable body 1 in parallel to the base body 2 with a combination of actuating, compliant, passive, and damping members, the geometry of the structure can be changed according to applied load and thus the ratio of the output to the input of the actuating linking members can be optimized for the task and type of actuators.

To achieve a desired behavior, the following properties are selected for the device:
1) the number of different types of linking members,
2) the arrangement and geometry of the kinematic chains that make up the linking members,
3) the geometry of the connections (i.e. the connection locations on the base body and movable body),
4) the spring rates of compliant linking members, and
5) the damping rates of the damping linking members.

The number and type of actuating, compliant, passive, and damping linking members are determined by the desired degree of constraint or freedom from the device.

The active compliant parallel device may provide for multiple advantages. One potential advantage, made possible by the compliant linking members, is the change in geometry according to applied load. This allows the position of the structure to change so that under high force or torque load, lower force or torque and higher speed is required of the actuating linking members, while under low force or torque, higher force or torque and lower speed is required of the actuating linking members. The result is an increased range in force or torque output and at the same time an increased range in speed. Through the parallel nature of the structure, a given load is distributed among the linking members resulting in lower loads for individual components. Because of the changing geometry, nonlinear spring behavior is more easily achievable. Spatial, as well as any lesser degree of freedom, compliant and actuating behavior can be realized by choosing the number and constraints of the linking members to yield the desired properties.

Figure 4:
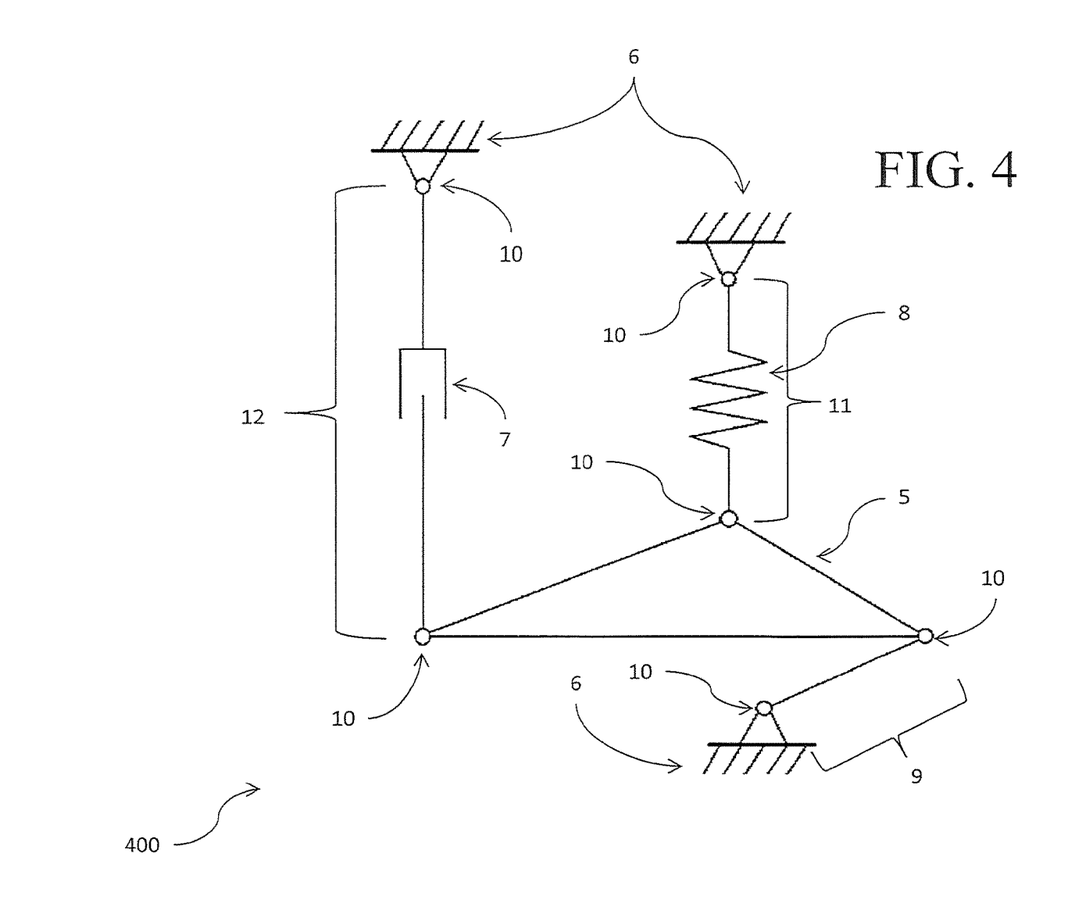
FIG. 4 is a schematic representation of a first arrangement of an active compliant parallel device.

FIG. 1 shows a perspective view of an active compliant parallel device 100. This arrangement is considered a general configuration and is not by any means exhaustive in its representation of the embodiment. With this device configuration, the constraint of the motion of the movable body 1 in relation to the base body 2 by the linking members 3, which include actuating linking members 33 and compliant linking members 34, is such that the number of actuated freedoms plus the number of compliantly controlled freedoms is equal to the total freedom of the motion of the movable body 1 in relation to the base body 2.

Where damping linking members are included in the device 100, the number of actuated freedoms plus the number of compliantly controlled freedoms plus the number of damped freedoms is equal to the total freedom of the motion of the movable body 1 in relation to the base body 2 allowed by the linking members 3. The result is that the movable body 1 is fully controlled by the linking members 3 in relation to the base body 2 but not redundantly so. FIG. 4 shows an example of this arrangement, as further described below.

Figure 5:
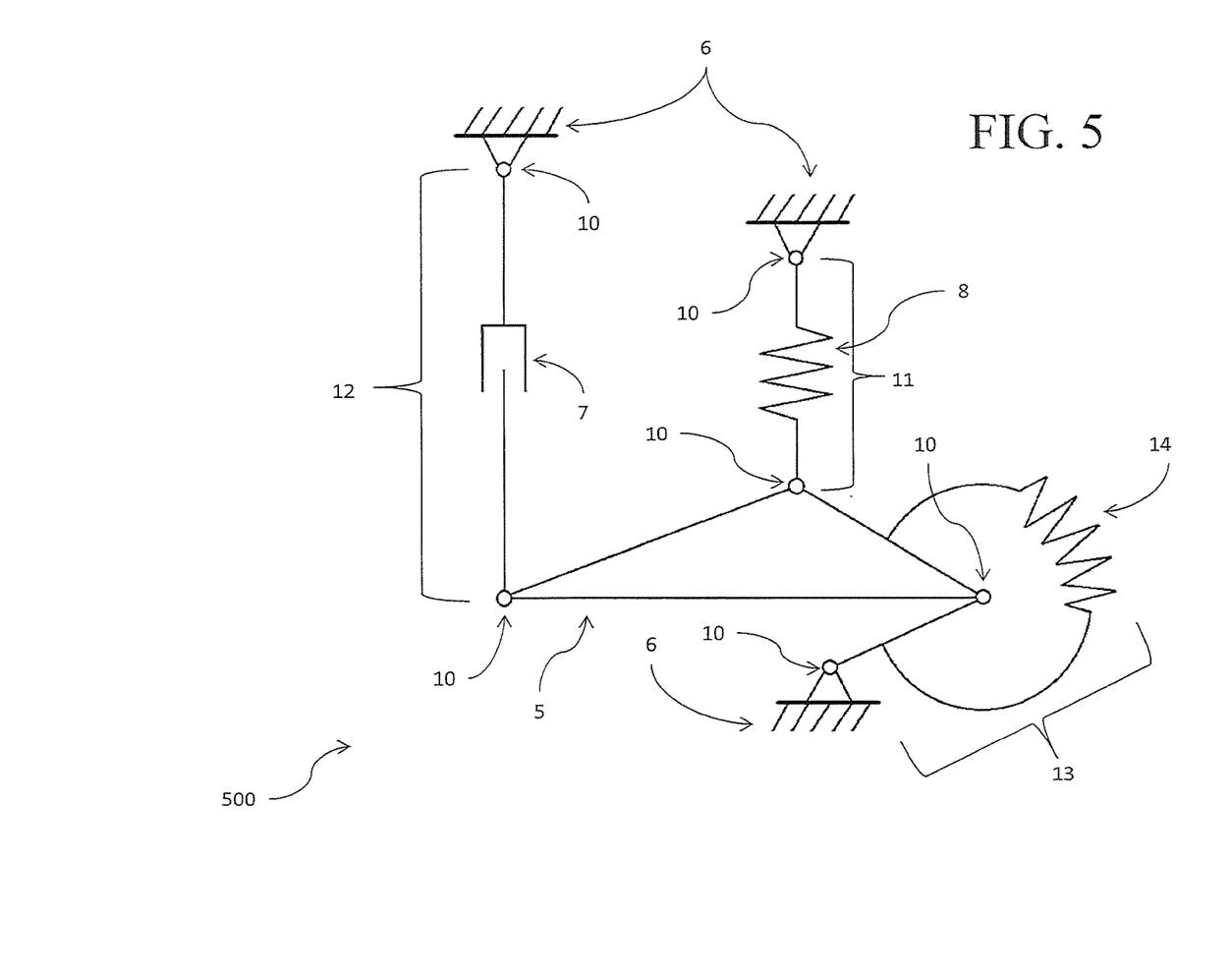
FIG. 5 is a schematic representation of a second arrangement of an active compliant parallel device.

FIG. 2 shows a perspective view of an active compliant parallel device 200. This arrangement is considered a general configuration and is not by any means exhaustive in its representation of the embodiment. With this device configuration, the constraint of the motion of the movable body 1 in relation to the base body 2 by the linking members 3, which include actuating linking members 33 and compliant linking members 34, is such that the number of actuated freedoms plus the number of compliantly controlled freedoms is greater than the total freedom of the motion of the movable body 1 in relation to the base body 2.

Where damping members are included in the device 200, constraint of the motion of the movable body 1 in relation to the base body 2 by the linking members 3 is such that the number of actuated freedoms plus the number of compliantly controlled freedoms plus the number of damped freedoms is greater than the total freedom of the motion of the movable body 1 in relation to the base body 2 allowed by the linking members 3. The result is that the movable body 1 is fully controlled by the linking members 3 in relation to the base body 2 with a redundant amount of constraints. The redundant constraints may be applied by actuating linking members, compliant linking members, passive linking members, damping linking members, or any combination of the same. An example of a qualifying arrangement is shown in FIG. 5, as further described below.

Figure 6:
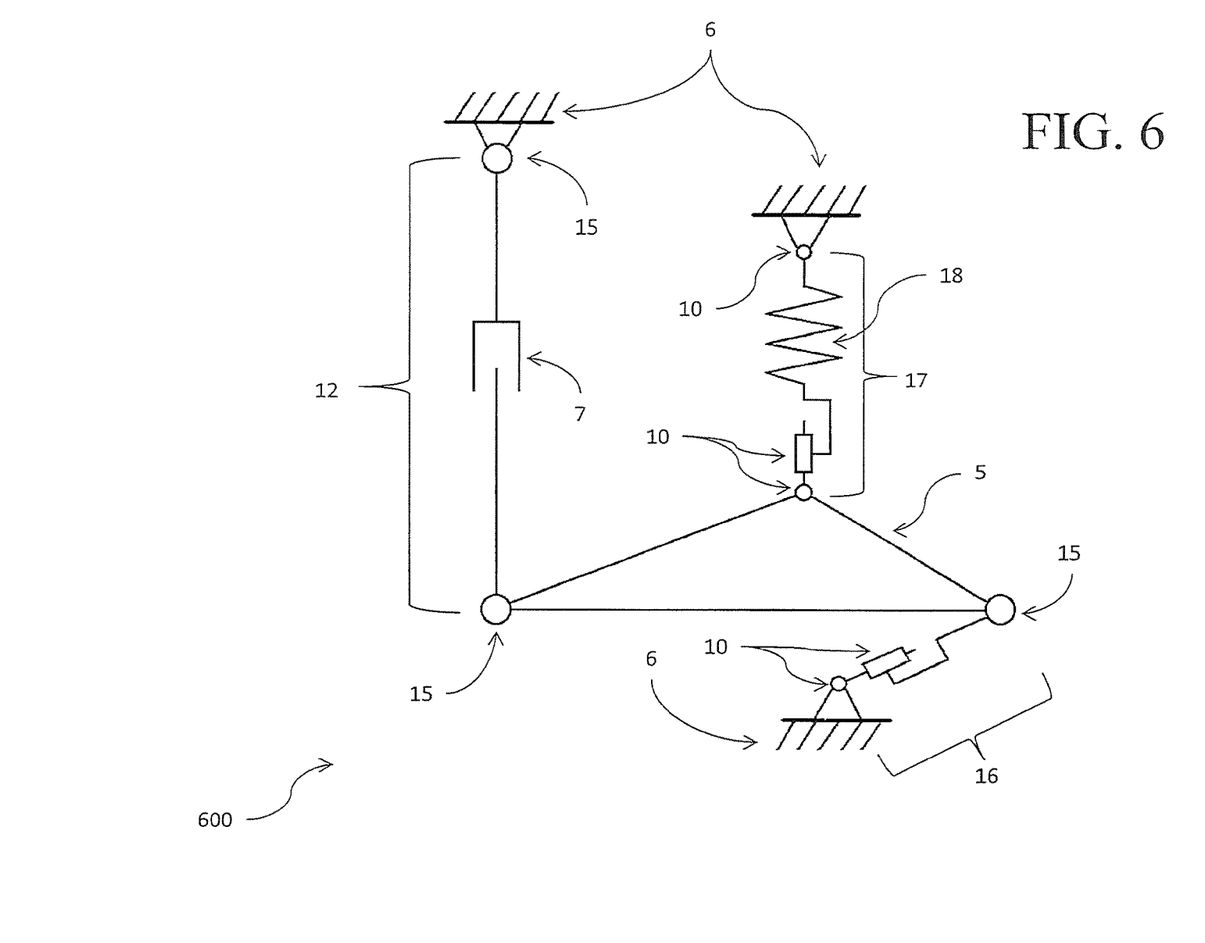
FIG. 6 is a schematic representation of a third arrangement of an active compliant parallel device.

FIG. 3 shows a perspective view of an active compliant parallel device 300. This arrangement is considered a general configuration and is not by any means exhaustive in its representation of the embodiment. With this device configuration, the constraint of the motion of the movable body 1 in relation to the base body 2 by the linking members 3, which include actuating linking members 33 and compliant linking members 34, is such that the number of actuated freedoms plus the number of compliantly controlled freedoms is less than the total freedom of the motion of the movable body 1 in relation to the base body 2.

Where damping members are included in the device 300, constraint of the motion of the movable body 1 in relation to the base body 2 by the linking members 3 is such that the number of actuated freedoms plus the number of compliantly controlled freedoms plus the number of damped freedoms is less than the total freedom of the motion of the movable body 1 in relation to the base body 2 allowed by the linking members 3. The result is that the movable body 1 is not fully constrained with relation to the base body 2. Thus, there exist degrees of freedom of the movable body 1 in relation to the base body 2 that are not constrained by any of the actuating, compliant, or damping members. An example of a qualifying arrangement is shown in FIG. 6, as further described below.

FIG. 4 shows a schematic view of an arrangement of an active compliant parallel device 400. In this arrangement, a movable body 5 is linked to the base body 6 by a passive linking member 9, a compliant linking member 11, and actuating linking member 12. The linking members link the movable body 5 to the base body 6 by means of revolute joints 10, which have an axis that is normal to the plane of FIG. 4.

According to this embodiment of the device, the actuating, compliant, or damping element of an actuating, compliant, or damping linking member may be applied so that it replaces one or more of the joints of the linking member. In this case, the compliant linking member 11 has a compliant element 8 to control one of its degrees of freedom. The compliant element 8 acts as a prismatic joint in this particular arrangement. This arrangement, however, is by no means exhaustive. For example, the compliant element 8 could be replaced with an actuating or damping element or the controlling element could be replaced by a revolute, prismatic, screw-type joint or any higher pair joint that is a combination of a revolute, prismatic, screw-type joint. In addition, the actuating linking member 12 is provided with an actuating element 7.

FIG. 5 shows a schematic view of an arrangement of an active compliant parallel device 500 where a movable body 5 is linked to a base body 6 by a compliant linking member 11, an actuating linking member 12, and a second compliant linking member 13. The linking members 11, 12, 13 link the movable body 5 to the base body 6 by means of revolute joints 10, which have an axis that is normal to the plane of FIG. 5. The compliant linking member 11 includes a compliant element 8, while the second compliant linking member 13 includes a second compliant element 14. In addition, the actuating linking member includes an actuating element 7.

FIG. 6 shows a schematic view of an arrangement of an active compliant parallel device 600 where a movable body 5 is linked to a base body 6 by an actuating linking member 12, a passive linking member 16, and a compliant linking member 17. The linking members 12, 16, 17 link the movable body 5 to the base body 6 by means of revolute joints 10 and spherical joints 15, where each has three rotational degrees of freedom. The spherical joints are kinematically equivalent to three revolute joints positioned so that their axes are normal to one another and two prismatic joints which are replaced by an actuating element and a compliant element. In this case, before the actuating and compliant elements are applied, the movable body 5 is constrained to have three kinematic freedoms with respect to the base body 6 by the linking members. Here, the sum of freedoms controlled by actuating, compliant, and damping elements is two, which is less than the three kinematic freedoms of the movable body with respect to the base body.

Figure 7:
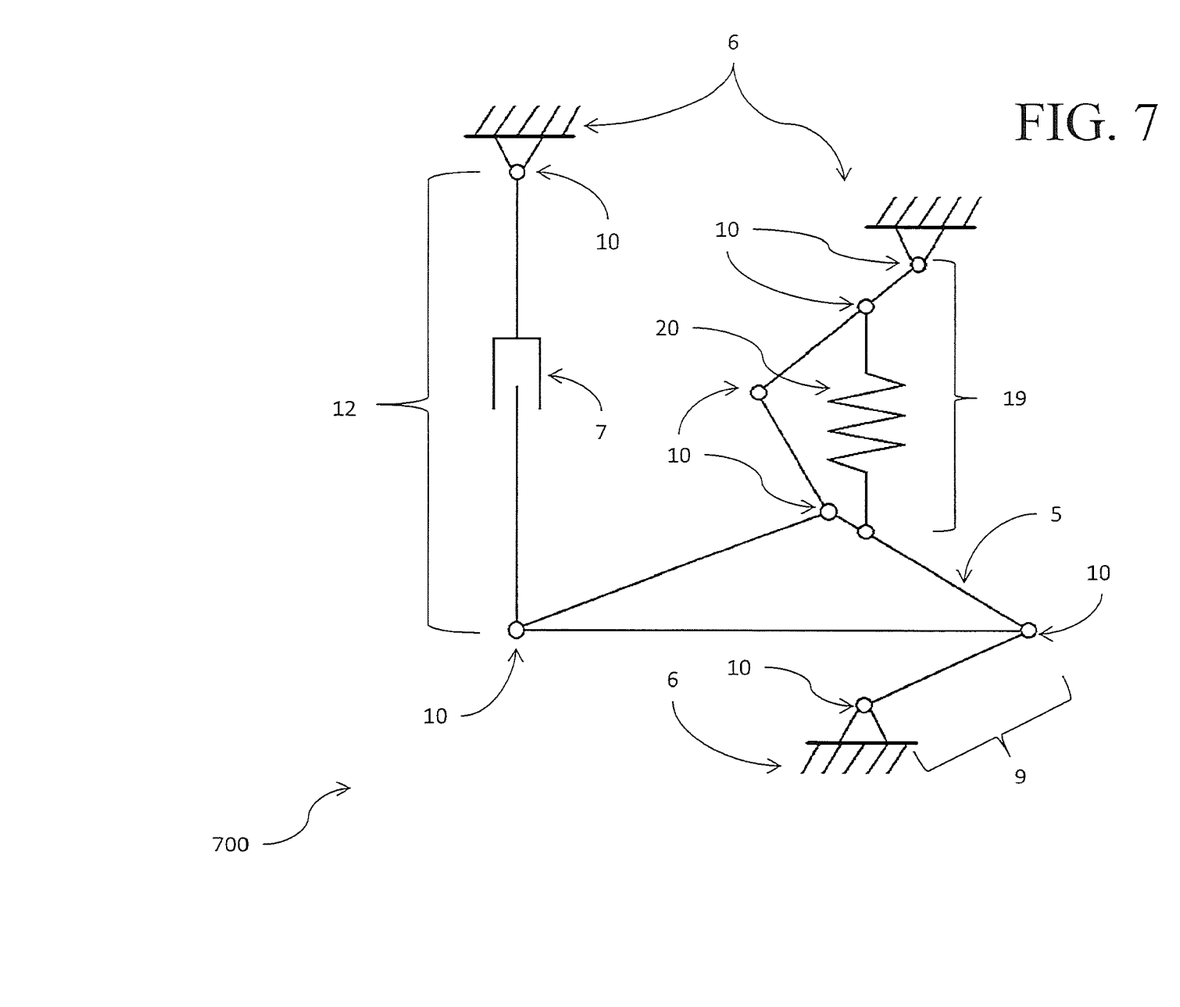
FIG. 7 is a schematic representation of a fourth arrangement of an active compliant parallel device.

FIG. 7 shows a schematic view of an arrangement of an active compliant parallel device 700 where a movable body 5 is linked to a base body 6 by means of a passive linking member 9, an actuating linking member 12, and a compliant linking member 19. Linking members 9, 12, 19 link the movable body 5 to the base body 6 by means of revolute joints 10, where each joint has an axis which is normal to the plane of FIG. 7. The complaint linking member 19 includes a compliant element 20 which is applied across a plurality of joints 10 to provide connection points with the movable body 5. In addition, the actuating linking member includes an actuating element 7.

Figure 8:
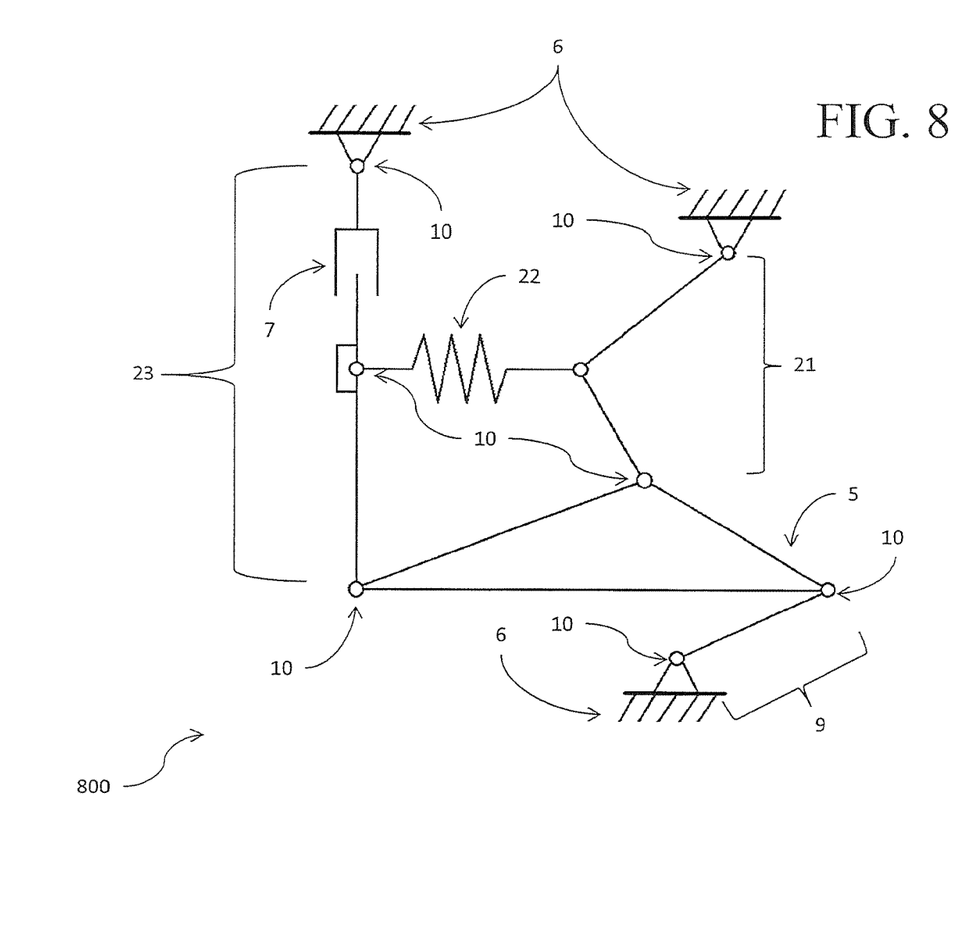
FIG. 8 is a schematic representation of a fifth arrangement of an active compliant parallel device.

FIG. 8 shows a schematic view of an arrangement of an active compliant parallel device 800 where the movable body 5 is linked to the base body 6 by a passive linking member 9, a compliant linking member 21, and an actuating linking member 23. The linking members 9, 21, 23 link the movable body 5 to the base body 6 by means of revolute joints 10, each having an axis which is normal to the plane of the FIG. 8. The compliant linking member 21 includes a compliant element 22 which crosses over to the actuating linking member 23 though use of multiple revolute joints 10. In addition, the actuating linking member 23 includes an actuating element 7.

Figure 9A:
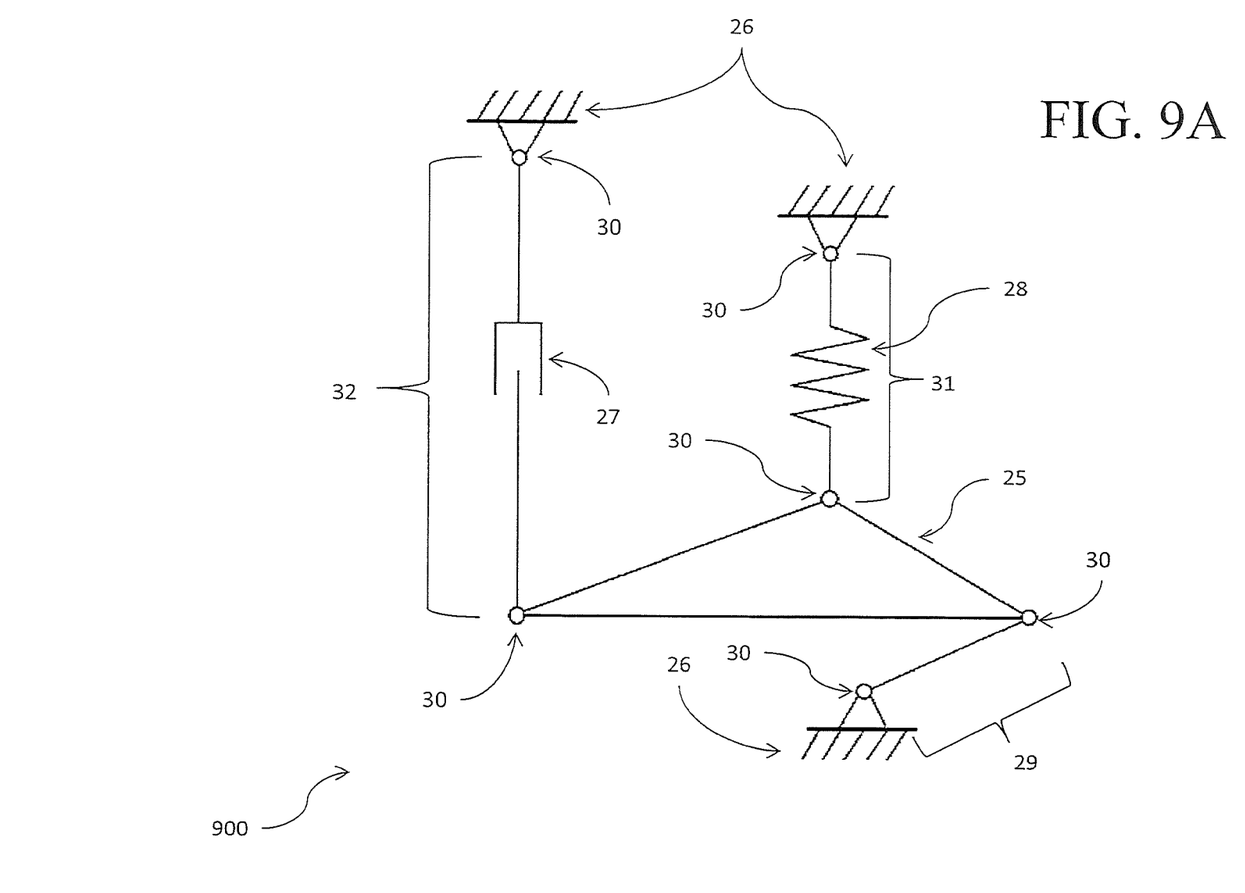
FIG. 9A is a schematic representation of a sixth arrangement of an active compliant parallel device.
Figure 9B:
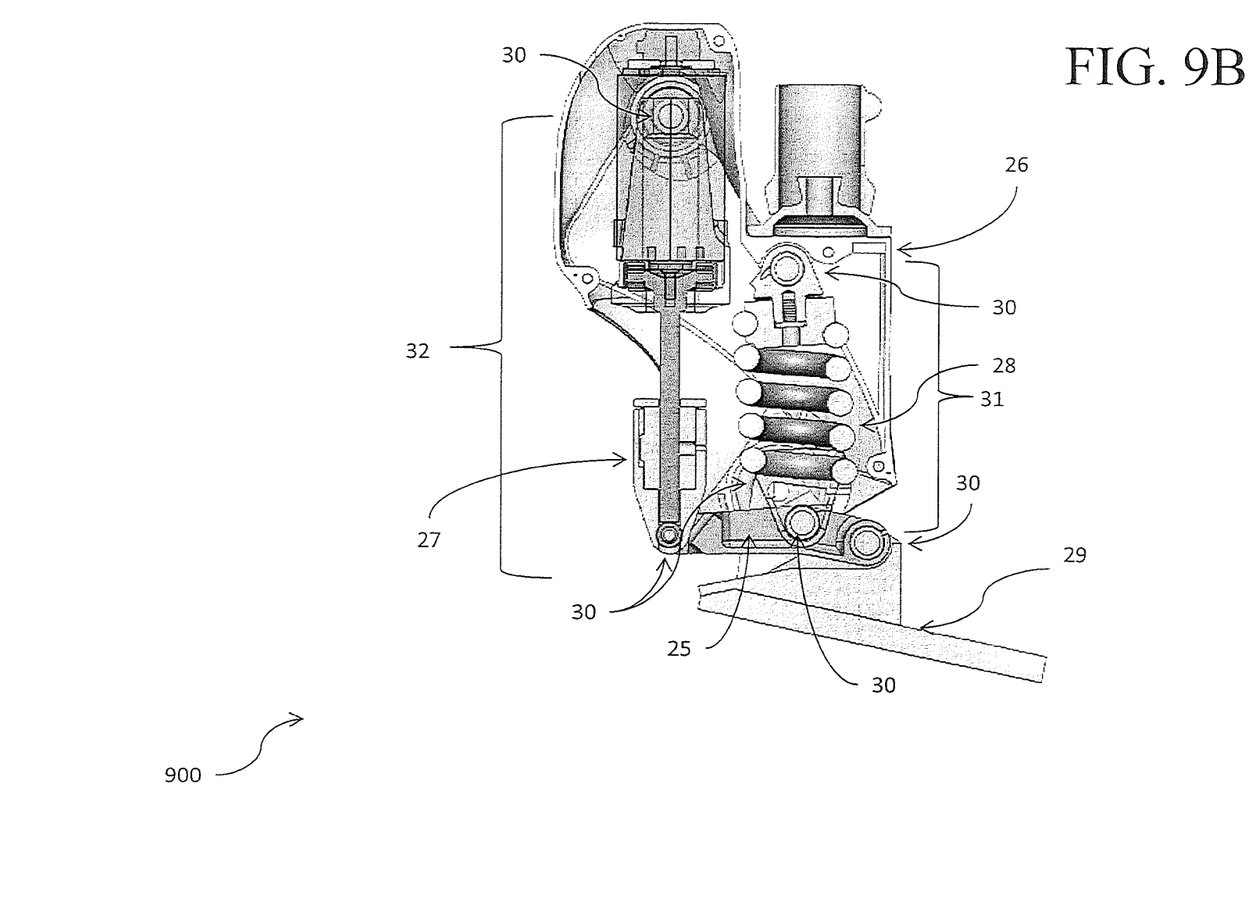
FIG. 9B is a cut-away view of an active compliant device, according to the schematic representation shown in FIG. 9A.

FIGS. 9A and 9B show schematic and cutaway views of an active compliant parallel device 900, having an arrangement similar to the active compliant parallel device 400, shown in FIG. 4. In this example, a movable body 25 is linked to the base body 26 by a passive linking member 29, a compliant linking member 31, and actuating linking member 32. In FIG. 9A, the linking members link the movable body 25 to the base body 26 by means of revolute joints 30, which have an axis that is normal to the plane of the figure.

As shown particularly in FIG. 9B, the active compliant parallel device 900 may be used for actuation of an ankle joint of a below the knee prosthesis, this type of prosthesis is also commonly known as a foot-ankle prosthesis. Here, the device 900 allows the actuating element 27, in this case an electric motor and screw, to provide the high force and high velocity needed by an ankle during gait while keeping the power required of the actuating element 27 low. During a typical walking gait cycle, the moment required from a human reaches a maximum value of approximately 1.25 newton meters per kilogram of body weight, while the typical velocity reaches a maximum of approximately 450 degrees per second, and the maximum power reaches approximately 6.5 Watts per kilogram of body weight. MICHAEL W. WHITTLE, GAIT ANALYSIS: AN INTRODUCTION (4th ed. 2007). Thus, the output moment, velocity, and power may, for example, range from about 1 newton meter per kilogram of body weight to about 1.5 newton meters per kilogram of body weight, about 400 degrees per second to about 450 degrees per second, and about 6 watts per kilogram of body weight to about 7 watts per kilogram of body mass. Therefore, through the use of the active compliant parallel device 900, approximately the same output moment, velocity, and power is supplied from an actuator of 2.3 Watts per kilogram of body mass.

The active compliant devices shown and described herein may be employed in a wide field of applications. Some application examples, which are in no way exhaustive, include fields that require actuation of joints for locomotion; necessitate high force and speed from lightweight devices, require actuation of arms; hands, legs, or feet; and fields using devices that have robotic end effectors which interact with unstructured or unpredictable environments. In addition, the devices may be utilized in any field where the storing and releasing of potential energy in a compliant component, such as a spring, is necessary.

Thus, improved active compliant parallel devices are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. An active compliant foot-ankle prosthesis, comprising:
    a movable body including a first joint, a second joint, and a third joint;
    a base body configured to couple to a limb of a user, the base body including a first revolute joint, a second revolute joint, and a third revolute joint;
    a foot member coupled between the first joint of the movable body and the first revolute joint of the base body;
    a spring coupled between the second joint of the movable body and the second revolute joint of the base body; and
    an actuating linking member disposed in a parallel arrangement with the spring and coupled between the third joint of the movable body and the third revolute joint of the base body, the actuating linking member configured to produce a gait motion by positioning the movable body to rotate the foot member about the first revolute joint of the base body.

2. The active compliant foot-ankle prosthesis of claim 1, wherein the actuating linking member includes a motor driven screw configured to change a length of the actuating linking member.

3. The active compliant foot-ankle prosthesis of claim 1, wherein the first joint includes a revolute joint.

4. The active compliant foot-ankle prosthesis of claim 1, wherein the movable body is configured as an end effector of the active compliant foot-ankle prosthesis.

5. The active compliant foot-ankle prosthesis of claim 1, wherein the foot member is configured as an end effector of the active compliant foot-ankle prosthesis.

6. A foot-ankle prosthesis, comprising:
    a movable body including a first joint, a second joint, and a third joint;

a base body configured to couple to a limb of a user, the base body including a fourth joint, a fifth joint, and a sixth joint;

a compliant linking member disposed between the first joint of the movable body and the fourth joint of the base body;

a foot member configured as an end effector of the foot-ankle prosthesis and disposed between the second joint of the movable body and the fifth joint of the base body; and an actuating linking member disposed in a parallel arrangement with the compliant linking member and coupled between the third joint of the movable body and the sixth joint of the base body, the actuating linking member configured to move the movable body to rotate the foot member to produce an output force or an output torque.

7. The foot-ankle prosthesis of claim 6, wherein the compliant linking member includes a spring.

8. The foot-ankle prosthesis of claim 6, wherein the actuating linking member includes an actuator configured to change a length of the actuating linking member.

9. The foot-ankle prosthesis of claim 6, further including a damper disposed between the movable body and the base body.

10. The foot-ankle prosthesis of claim 6, further including a spring coupled between the movable body and the foot member.

11. A method of making an active compliant foot-ankle prosthesis, comprising:
   providing a movable body including a first joint, a second joint, and a third joint;
   providing a base body including a first revolute joint, a second revolute joint, and a third revolute joint;
   disposing a first spring between the first joint of the movable body and the first revolute joint of the base body;
   coupling a foot member between the second joint of the movable body and the second revolute joint of the base body;
   disposing an actuating member in a parallel arrangement with the first spring and coupled between the third joint of the movable body and the third revolute joint of the base body; and
   actuating the actuating member to position the movable body which rotates the foot member about the base body at the second revolute joint to produce an output force or an output torque.

12. The method of claim 11, further including actuating the actuating member to change a length of the actuating member to position the movable body.

13. The method of claim 11, further including producing the output force or the output torque at a joint between the foot member and the base body.

14. The method of claim 11, further including coupling a damping member between the movable body and the base body.

15. The method of claim 11, further including coupling a second spring between the movable body and the foot member.

16. The method of claim 11, further including:
   coupling the first spring to the movable body at a first joint;
   coupling the actuating member to the movable body at a second joint; and
   coupling the foot member to the movable body at a third joint.

17. A method of making an active compliant parallel device, comprising:
   providing a movable body;
   providing a base body including a first joint, a second joint, and a third joint;
   disposing a compliant member between the movable body and the first joint of the base body;
   coupling a foot member between the movable body and a second joint of the base body, wherein the foot member is configured as an end effector of the active compliant parallel device;
   disposing an actuating member in parallel with the compliant member and coupled between the movable body and the third joint of the base body; and
   actuating the actuating member to position the movable body to rotate the foot member about the base body.

18. The method of claim 17, further including producing an output force or an output torque at the foot member.

19. The method of claim 17, further including coupling a damping member between the movable body and the base body.

20. The method of claim 17, further including actuating the actuating member to change a length of the actuating member to position the movable body.

21. The method of claim 17, further including:
   coupling the compliant member to the movable body at a first joint; and
   coupling the actuating member to the movable body at a second joint.

22. The method of claim 11, further including engaging the actuating member throughout a gait cycle.

* * * * *